United States Patent [19]

Pope et al.

[11] 4,213,491

[45] Jul. 22, 1980

[54] PNEUMATIC TIRE CONTAINING WATER-DISPERSIBLE PUNCTURE SEALANT

[75] Inventors: George A. Pope; Alan J. Bourne, both of Sutton Coldfield, England

[73] Assignee: Dunlop Limited, London, England

[21] Appl. No.: 931,932

[22] Filed: Aug. 8, 1978

[30] Foreign Application Priority Data

Aug. 11, 1977 [GB] United Kingdom ............... 33692/77

[51] Int. Cl.$^2$ .............................................. B60C 17/00
[52] U.S. Cl. ................................ 152/330 L; 152/347; 156/115
[58] Field of Search ............ 156/115; 152/152, 330 R, 152/330 RF, 330 L, 346, 347, 348

[56] References Cited

U.S. PATENT DOCUMENTS

| | | | |
|---|---|---|---|
| 3,110,669 | 11/1963 | Borg .................... | 152/330 L |
| 3,931,843 | 1/1976 | Edwards et al. ................. | 152/330 L |
| 3,946,783 | 3/1976 | Edwards et al. ................. | 152/330 L |
| 3,981,342 | 9/1976 | Farber et al. ......................... | 152/347 |
| 4,051,884 | 10/1977 | Bourne et al. .................... | 152/330 L |
| 4,057,090 | 11/1977 | Hoshikawa et al. ............. | 156/115 X |
| 4,090,546 | 5/1978 | Honda et al. ......................... | 152/347 |
| 4,096,898 | 6/1978 | Messerly et al. .................. | 152/330 L |
| 4,109,695 | 8/1978 | Miyazato .............................. | 152/347 |

FOREIGN PATENT DOCUMENTS

| | | |
|---|---|---|
| 544670 | 4/1942 | United Kingdom . |
| 755672 | 8/1956 | United Kingdom . |
| 796908 | 6/1958 | United Kingdom . |
| 1246278 | 9/1971 | United Kingdom . |
| 1359467 | 7/1974 | United Kingdom . |
| 1444347 | 7/1976 | United Kingdom . |
| 1497864 | 1/1978 | United Kingdom . |

*Primary Examiner*—John E. Kittle
*Attorney, Agent, or Firm*—Stevens, Davis, Miller & Mosher

[57] ABSTRACT

A pneumatic tire to the interior surface of which there has been applied a puncture sealant containing a lubricant (as hereinbefore defined) comprising a polybutene, and a surfactant.

16 Claims, No Drawings

PNEUMATIC TIRE CONTAINING WATER-DISPERSIBLE PUNCTURE SEALANT

This invention relates to pneumatic tires capable of running to a useful extent even when deflated, the tires having on their interior surface a coating of a puncture sealant, and to puncture sealants for use in the coatings.

Various proposals have been made for the use of materials applied to the interior surface of a pneumatic tire which, in the event of the tire being punctured, will act as a sealant to seal the puncture and permit further use of the tire at least to an extent which will enable a vehicle equipped with the tires to be driven to a place of repair. Such materials are referred to herein as "puncture sealants". Proposals for the use of puncture sealants include, for instance, those in which the sealant is used in conjunction with means to re-inflate the tire at least to some extent after the sealant has sealed the puncture, and those which are used with a lubricant, that is, a material which facilitates relative movement between contacting portions of the interior surface when the tire is driven deflated; and in these latter cases the sealant and lubricant are conveniently constituents of the same composition applied to the interior surface of the tire.

Polybutene compositions have been previously proposed for use as lubricants in puncture sealants and, as such, have valuable properties. However, we have found that a disadvantage shown by tires treated with a coating containing a polybutene is that, if it is desired to re-tread the tires, it is difficult to remove the sealant coating from the tire which is normally a necessary step in the re-treading process or in puncture repair work. According to the present invention, it has been found that the disadvantage referred to above can be obviated by using novel puncture sealants the subject of this present invention.

In a first aspect the invention comprises a pneumatic tire to the interior surface of which there has been applied a puncture sealant containing a lubricant (as hereinbefore defined) comprising a polybutene, and a surfactant.

In a second aspect the invention provides puncture sealant which comprises a mixture of a lubricant (as hereinbefore defined) comprising a polybutene, a solid particulate filler and a surfactant.

The formulation of the puncture sealants of the invention should be such that when they are applied to the interior surface of a run-flat tire, at least to a central area of said surface (for example the circumferential zone containing the mid-circumferential plane of the tire), the resulting coating is not capable of being lost from this area of the tire, either when the tire is stationary or when it is running inflated.

The nature and quantity of the non-ionic surfactant should be such that it does not unduly derogate from the properties of the sealant used on the tire. Effectiveness of surfactants depends on a balance between their hydrophobic and hydrophillic chemical structures. We have found that a very useful class of non-ionic surfactants are polymerisation products of alkylene oxides (for example ethylene oxide), for example condensation products of ethylene oxide with phenols. Suitable phenols are alkyl phenols having a medium length alkyl chain, for example ones having six to twelve carbon atoms in an alkyl radical. Very good results have been obtained using surfactants obtained by reaction of nonyl phenol and ethylene oxide. The products normally have an ethylene oxide: nonyl phenol mole ratio in the range 3:1 to 40:1 for example 9:1 to 12:1. For example, condensates of ethylene oxide and nonyl phenol that are suitable are those sold under the Trade Names Tergitol NPX (ex Union Carbide Corporation) and Empilan NP 9 (ex Albright & Wilson Limited) which respectively have an ethylene oxide: nonyl phenol ratio of 10.5:1 and 9:1. Suitable surfactants have an HLB value in the range of 10 to 15. The non-ionic surfactant is normally blended in the sealant prior to application to the tire. So far as the proportion of the surfactant is concerned, it should, of course, be sufficient to fulfill the purpose of its use, that is the removal of sealant from a used tire in, or prior to, a re-treading process. We have found that in sealants containing a polybutene an amount of non-ionic surfactant in the range from 8 to 20%, especially from 10 to 20% by weight of the sealant (i.e. the weight not including the weight of the non-ionic surfactant) is satisfactory with respect to function in the tire and to subsequent removal therefrom. Such removal can be, for example, by use of water as a jet applied to the interior surface of the tire under high pressure, for instance 70 psi (483 KPa). Where the lubricant is a gelled polybutene, it can contain as gelling agent a polyolefin. Suitable olefines for this purpose are low density polyethylenes, high density polyethylenes and polypropylenes; and good results have been obtained using a mixture of a high density polyethylene and a low density polyethylene. If desired, an amide wax (e.g. a Glokem DMS ex ABM Chemicals Limited) can be used as a gelling agent.

The gelled puncture sealant preferably contains a particulate solid filler, for example rubber crumb or wood flour. Where a filler is used the ingredients can, for example, be in a proportion of filler/lubricant in the range 1:10 to 7.5:10 especially from 2:10 to 6:10 by weight.

The use of high density and/or low density polyethylenes in the compositions normally calls for the use of each in an amount in the range from 1 to 10% by weight of the lubricant. Where both low and high density polyethylenes are used, the low density polymer or polymers is normally used in an amount greater than that of the high density polymer or polymers.

The invention is illustrated by the following Examples.

EXAMPLE 1

A lubricant/sealant composition suitable for application to the interior surface of a run-flat tire and removable therefrom using a jet of water at high pressure was obtained by blending together the following:-

|  | Parts by Weight |
| --- | --- |
| Hyvis 10 (a polyisobutylene having up to 10% of 1-butene having a molecular weight of about 1000, manufactured by B.P. Chemicals Ltd.) | 94 |
| Rigidex 140/60 (a high density polyethylene m.p. 128–140° C. manufactured by B.P. Chemicals Ltd.) | 2 |
| AC 8 (a low density polyethylene softening at 106°–108° C. manufactured by Allied Chemicals Ltd.) | 4 |
|  | 100 |
| Tergitol NPX (a non-ionic sur- | 15 |

| | Parts by Weight |
|---|---|
| factant obtained by the reaction of ethylene oxide and nonyl phenol and containing approximately 10.5 moles of ethylene oxide per mole of nonyl phenol. It has a HLB value of 13.5). | |
| Rubber crumb (20 mesh) | 57.5 |

EXAMPLES 2-5

Four other lubricant/sealant compositions were obtained as described in Example 1 except that in each case of them the amount of rubber crumb was 50 parts by weight and the amount of surfactant was 17 parts by weight. The surfactant in each of Examples 2-5 was, as in Example 1, a condensate of nonyl phenol and ethylene oxide, the four surfactants having the following Trade Names and origins:-

| Example No. | Trade Name | Origin |
|---|---|---|
| 2 | Tergitol NPX | Union Carbide Corpn. |
| 3 | Empilan NP9 | Albright & Wilson Ltd. |
| 4 | Ethylan | Lankro Chemicals Ltd. |
| 5 | Synperonic NXP | I.C.I. Ltd. |

The lubricant/sealant composition of each of Examples 1-5 satisfied the following tests:-
 (a) stability after 72 hours at 100° C. - as evidenced by lack of flow on a glass slide inclined at 45° in an oven;
 (b) no liquid separation after centrifuging at 2000 rpm for 5 hours at 55° C., and
 (c) ability to be removed from rubber surface using a high pressure water supply (70 psi).

Viscosities of the lubricant/sealant compositions of Examples 2-5 measured at room temperature and $0.31s^{-1}$ using a Ferranti portable viscometer were approximately 5324, 5203, 4356 and 4840 $Ns/m^2$ respectively.

EXAMPLE 6

A further lubricant/sealant composition suitable for application to the interior surface of a run-flat tire and removable therefrom using a jet of water at high pressure was obtained by blending together the following:-

| | Parts by Weight |
|---|---|
| Hyvis 10 | 92.5 |
| Amide Wax | 7.5 |
| Tergitol NPX | 17 |
| Rubber Crumb | 50 |

The amide wax was a diamide wax derived from stearic acid, montanic acid and ethylene diamine, and believed to have the formula: $R_1-CO-NH-CH_2-CH_2-NH-CO-R_2$ where $R_1=C_{17}H_{35}-$ and $R_2=C_{27}H_{55}-$.

EXAMPLES 7-10

The following compositions were prepared and coated (300 g) respectively on the interior surface of four 155/65 SF 310 Denovo tires (Denovo is a Registered Trade Mark):

| | Example No. | | | |
|---|---|---|---|---|
| | 7 | 8 | 9 | 10 |
| Hyvis 10 | 94 | 94 | 94 | 94 |
| AC 8 | 4 | 4 | 4 | 4 |
| Rigidex 140/60 | 2 | 2 | 2 | 2 |
| Rubber crumb (20 mesh) | 58.5 | 58.5 | 58.5 | 58.5 |
| Tergitol NPX | 17 | — | — | — |
| Empilan NP 9 | — | 17 | — | — |
| Ethylan BCP | — | — | 17 | — |
| Synperonic NXP | — | — | — | 17 |

The tires were inflated to 26 psi (1.828 $kg/cm^2$) and then subjected to a test simulating running on a road at 50 mph (80.46 km/hour). After the equivalent of 1000 miles (1609 km) running, the coatings were examined and found to have remained in position on the inner surfaces of the tire. The width of the coating across the tire was in all cases 3.35 inches (8.5 cm).

The puncture sealing effectiveness of the composition of Example 10 was assessed by its ability to seal holes made by drilling and by hammering nails directly into a tire.

(a) DRILLED HOLES

Eight holes were made in the tire tread using an electric drill and bit of diameter 0.077 inch (0.196 cm). The leak rate of each hole was measured at 5 psi (34.5 KPa) using a bubble flow meter and varied from 34 to 56 cc/sec. They were then temporarily plugged using nails of length one inch (2.54 cm) and diameter 0.084 inch (0.213 cm).

After coating the inner surface of the tire with the sealant composition and stabilisation by 'running' for one hour at 50 mph (80.46 km/hour) on a revolving drum, the pressure was set at 28 psi (193.2 KPa) and the first nail removed. The tire was then run immediately for five minutes at 50 mph (80.46 km/hour). On stopping it was found that the hole had sealed and that the tire pressure was 15 psi (103.5 KPa). The tire was then reinflated to 28 psi (193.2 KPa) and the test repeated for the other nails. All these holes sealed between 15 and 22 psi (103.5 - 151.8 KPa). After removal of the last nail the tire was run for 7 hours at 50 mph (80.46 km/hour) and at the end of that period it was found that all the holes had remained sealed.

(b) NAIL HOLES

Eight nails of length one inch (2.54 cm) and diameter 0.084 inch (0.213 cm) were hammered into the tire tread. After coating the inner surface of the tire with the sealant composition of Example 10 and stabilisation by running for one hour at 50 mph (80.46 km/hour), the nails were removed from the tire one by one. If, after removal of a nail, the resulting puncture "hole" leaked the tire was run for a further five minutes at 50 mph (80.46 km/hour) and the pressure re-checked. Otherwise, without further running, the next nail was removed.

As a result of these eight nail tests it was found that the maximum pressure loss was as little as 0.25 psi (1.73 KPa) from an initial pressure of 28 psi (193.2 KPa).

Having now described our invention what we claim is:

1. A pneumatic tire having on its interior surface a puncture sealant comprising: (a) a polybutene lubricant to facilitate relative movement between contacting portions of said interior surface when the tire is driven in a deflated condition, (b) a non-ionic surfactant and (c) a particulate solid filler.

2. A tire according to claim 1, in which the polybutene lubricant is comprised of a major portion of gelled polyisobutylene.

3. A tire according to claim 1, in which the lubricant is a gelled lubricant containing a polyolefin gelling agent therefor.

4. A tire according to claim 3, in which said gelling agent comprises a mixture of a high density polyethylene and a low density polyethylene.

5. A tire according to claim 4, in which the weight of each of said polyolefins is in the range from 1 to 10% by weight of the lubricant without the polyolefins.

6. A tire according to claim 4, in which the weight of the low density polyethylene present is greater than that of the high density polyethylene.

7. A tire according to claim 1, in which the surfactant is a polymerisation product of an alkylene oxide.

8. A tire according to claim 7, in which the surfactant is a polymerisation product of ethylene oxide.

9. A tire according to claim 8, in which the surfactant is a polymerisation product of ethylene oxide and an alkyl phenol having from six to twelve carbon atoms in an alkyl chain.

10. A tire according to claim 9, in which the surfactant is a polymerisation product of a nonyl phenol and ethylene oxide in which the ethylene oxide: nonyl phenol ratio is in the range from 3:1 to 40:1.

11. A tire according to claim 10, in which said ratio is in the range from 9:1 to 12:1.

12. A tire according to claim 1, in which the amount of surfactant in the sealant is in the range from 8 to 20% by weight of the sealant not including said surfactant.

13. A tire according to claim 12, in which said amount is in the range from 10% to 20% by weight.

14. A tire according to claim 1, in which the sealant has been applied to a circumferential zone of the interior surface of the tire, said zone including the mid-circumferential plane of the tire.

15. A tire according to claim 1, in which said filler is a rubber crumb.

16. A tire according to claim 1, in which the rubber crumb: lubricant ratio is in the range from 1:10 to 7.5:10 by weight.

* * * * *